United States Patent
Claudel

(10) Patent No.: US 9,047,775 B2
(45) Date of Patent: Jun. 2, 2015

(54) APPARATUS, SYSTEM, AND METHOD FOR ROADWAY MONITORING

(75) Inventor: Christian Claudel, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 0 days.

(21) Appl. No.: 13/552,341

(22) Filed: Jul. 18, 2012

(65) Prior Publication Data

US 2013/0024100 A1    Jan. 24, 2013

Related U.S. Application Data

(60) Provisional application No. 61/509,439, filed on Jul. 19, 2011.

(51) Int. Cl.
| | |
|---|---|
| G06G 7/76 | (2006.01) |
| G01C 21/34 | (2006.01) |
| G08G 1/0968 | (2006.01) |
| G08G 1/01 | (2006.01) |
| G08G 1/04 | (2006.01) |

(52) U.S. Cl.
CPC ........ G08G 1/096811 (2013.01); G08G 1/0116 (2013.01); G08G 1/0133 (2013.01); G08G 1/04 (2013.01); G08G 1/096844 (2013.01)

(58) Field of Classification Search
CPC .......... G08G 1/0104; G08G 1/096716; G08G 1/0967; G08G 1/096708; G08G 1/0968
USPC ......... 701/117, 118, 201, 202, 209, 423, 414, 701/415, 439, 204, 409; 340/934, 943, 933, 340/905; 377/9
See application file for complete search history.

(56) References Cited

U.S. PATENT DOCUMENTS

| | | | | |
|---|---|---|---|---|
| 3,059,232 | A * | 10/1962 | Barker | 342/104 |
| 4,591,823 | A * | 5/1986 | Horvat | 340/936 |
| 5,486,819 | A * | 1/1996 | Horie | 340/905 |
| RE41,492 | E * | 8/2010 | Mori et al. | 701/455 |
| 2002/0030605 | A1* | 3/2002 | Roberts, Jr. | 340/905 |
| 2006/0202863 | A1* | 9/2006 | Kavaler | 340/941 |
| 2008/0085686 | A1* | 4/2008 | Kalik | 455/154.1 |
| 2008/0157970 | A1* | 7/2008 | Single et al. | 340/572.1 |
| 2008/0221783 | A1* | 9/2008 | Boss et al. | 701/117 |
| 2010/0268460 | A1* | 10/2010 | Wan et al. | 701/210 |
| 2011/0096167 | A1* | 4/2011 | Pintado et al. | 348/149 |
| 2011/0130636 | A1* | 6/2011 | Daniel et al. | 600/301 |
| 2011/0199231 | A1* | 8/2011 | Loiselle et al. | 340/907 |
| 2012/0056756 | A1* | 3/2012 | Yester | 340/901 |
| 2012/0166076 | A1* | 6/2012 | Hardy | 701/414 |

FOREIGN PATENT DOCUMENTS

KR        99026306 A  *  4/1999

* cited by examiner

*Primary Examiner* — Mary Cheung
*Assistant Examiner* — Rodney Butler
(74) *Attorney, Agent, or Firm* — Steptoe & Johnson LLP

(57) ABSTRACT

An apparatus, system, and method for monitoring traffic and roadway water conditions. Traffic flow and roadway flooding is monitored concurrently through a wireless sensor network. The apparatus and system comprises ultrasound rangefinders monitoring traffic flow, flood water conditions, or both. Routing information may be calculated from the traffic conditions, such that routes are calculated to avoid roadways that are impassable or are slow due to traffic conditions.

30 Claims, 8 Drawing Sheets

APPARATUS, SYSTEM, AND METHOD FOR ROADWAY MONITORING

CLAIM OF PRIORITY

This application claims priority to U.S. Provisional Patent Application No. 61/509,439, filed on Jul. 19, 2011, which is hereby incorporated by reference in its entirety.

BACKGROUND OF THE INVENTION

1. Field of the Invention

This invention relates to monitoring roadways through a wireless sensor network and more particularly relates to an apparatus, system, and method for integrated ultrasonic traffic flow and roadway flood monitoring. The system can include ultrasound rangefinders and/or remote infrared temperature sensors for monitoring traffic flow, flood water conditions, or both.

2. Description of the Related Art

Current traffic monitoring or flood monitoring systems are dedicated and are only used for one application. Further, there are no real time urban flood monitoring systems which exist to date. Existing flood monitoring systems only measure water levels in rivers or lakes and existing traffic monitoring systems only measure traffic. This lack of urban flood monitoring leaves urban settings at a disadvantage for sensing and reacting to flooding situations, such as flash floods. Emergency response would benefit from information relating both to the flood and traffic information. Such information would lead to quicker response times for emergency personnel and to quicker evacuation of non-emergency personnel from flooded areas.

Traditional sensor-network based systems have several drawbacks, first they can only monitor floods arising from surrounding rivers (for instance flash floods cannot be monitored using traditional systems). Additionally, while these sensor-network based systems can predict when a river will start to flood the surrounding urban areas, they cannot track the evolution of the flood itself. Satellite based flood monitoring systems also have disadvantages. They do not have real time capabilities, they are image-based, and they can only assess the extension of the flood after the clouds have dissipated, i.e. hours or more after the flood started.

SUMMARY OF THE INVENTION

Unlike standard traffic monitoring or flood monitoring systems which are dedicated (i.e. can only be used for one application), embodiments of this invention enable the sensing of two physical phenomena at the same time: traffic and floods. Thus, the invention gives an additional financial incentive (reduced costs of floods damage through better information and management) for an agency to deploy a traffic sensing infrastructure.

Additionally, embodiments of this invention will monitor and forecast the height of water on roads during floods, enabling local authorities to assess which roads are unusable by standard vehicles, and which roads are fordable by relief vehicles. They will also enable the generation of a map of usable roads and accessible areas for emergency services in real time, which is critical information during floods and, in particular, flash flood events.

The referenced shortcomings are not intended to be exhaustive, but rather are among many that tend to impair the effectiveness of previously known techniques in monitoring traffic and water conditions on roadways; however, those mentioned here are sufficient to demonstrate that the methodologies appearing in the art have not been satisfactory and that a significant need exists for the techniques described and claimed in this disclosure.

From the foregoing discussion, it should be apparent that a need exists for an apparatus, system, and method for monitoring conditions on roadways.

An embodiment of the invention relates to a system of ultrasound rangefinders which monitors traffic flow, water/flood conditions, or both. An embodiment of the system consists in two parts:

1) A wireless sensor network composed of wireless sensor boards connected to ultrasound transducers and/or remote infrared temperature sensors pointing towards the ground, and located in an urban environment, over roads to be monitored. Each sensor board processes measurement data with its neighbors to estimate local traffic conditions as well as local floods conditions. Local traffic conditions correspond to the local density, flow and velocity conditions across a roadway link. Local flood conditions correspond to the estimated height of water over the ground.

2) A backend server system processing the local traffic and flood conditions data relayed by the sensor nodes. The global traffic conditions are estimated using traffic flow models and origin destination models to create a map of current and future traffic flow conditions. The global flood conditions are forecasted using current conditions, meteorological data and sewer models.

A general embodiment is an apparatus to monitor traffic and roadway water conditions, the apparatus comprising: a communication module configured to send and receive information wirelessly; an ultrasound transducer and/or a remote infrared temperature sensor; a traffic monitoring module configured to receive traffic information from the ultrasound transducer and/or a remote infrared temperature sensor; and a roadway water monitoring module configured to receive roadway water information from the ultrasound transducer. In specific embodiments the traffic monitoring module is further configured to determine the traffic conditions from the received traffic information and the water monitoring module is further configured to determine the presence of water from the received roadway water information. The determined traffic conditions can be heavy traffic, medium traffic, light traffic and no traffic. The determined traffic conditions can be an estimated vehicle flow and/or an estimated vehicle speed. The roadway water monitoring module may also be configured to determine the presence of precipitation and/or configured to determine the depth of the water. In an embodiment of the invention, the received traffic information comprises information selected from the group consisting of number of cars, time between passing cars, and speed of passing cars. A microcontroller may comprise the traffic monitoring module and the roadway water monitoring module.

Another general embodiment is a system to monitor traffic and roadway water conditions, the system comprising: an ultrasound sensor comprising a wireless communication device and an ultrasound transducer wherein the ultrasound transducer is configured to monitor traffic and roadway water conditions; and a central computer configured to receive roadway condition information from the ultrasound sensor. The system may further comprise a plurality of ultrasound sensors configured to communicate with neighboring ultrasound sensors. An embodiment may further comprise a CPU configured to determine the traffic conditions and the roadway water conditions at the ultrasound sensor. The ultrasound sensor may comprise the CPU and/or the central computer may comprise the CPU. In another embodiment of the invention, the central computer is configured to determine the roadway conditions at each of the plurality of ultrasound sensors from the received roadway condition information. The central computer may also be configured to map the roadway conditions at each of the plurality of ultrasound sensors from the received roadway condition information. The determined roadway conditions may indicate if a road is passable. In an embodiment of the invention, the central computer is configured to further receive routing location information comprising a start location and an end location and to determine a route from the start location to the end location that avoids impassable roads.

Another general embodiment is a computer program product comprising a computer readable medium having computer usable program code executable to perform operations for monitor traffic and roadway water conditions, the operations of the computer program product comprising: receiving a plurality of roadway condition information comprising a roadway location, traffic condition information and water condition information; determining if the roadway location is impassable, determining if the traffic condition at the location; and mapping the plurality of roadway information by location. The computer program product may further comprise receiving routing information comprising a start location and an end location and determining a route from the start location to the end location that avoids impassable roadway locations, and may also map the route. The determined traffic condition may be heavy traffic, medium traffic, light traffic, or no traffic. The determined route may also avoid roadway locations with heavy traffic.

The term "coupled" is defined as connected, although not necessarily directly, and not necessarily mechanically.

The terms "a" and "an" are defined as one or more unless this disclosure explicitly requires otherwise.

The term "substantially" and its variations are defined as being largely but not necessarily wholly what is specified as understood by one of ordinary skill in the art, and in one non-limiting embodiment "substantially" refers to ranges within 10%, preferably within 5%, more preferably within 1%, and most preferably within 0.5% of what is specified.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements possesses those one or more steps or elements, but is not limited to possessing only those one or more elements. Likewise, a step of a method or an element of a device that "comprises," "has," "includes" or "contains" one or more features possesses those one or more features, but is not limited to possessing only those one or more features. Furthermore, a device or structure that is configured in a certain way is configured in at least that way, but may also be configured in ways that are not listed.

As used herein, "traffic conditions" refers to the level of traffic on a roadway. For example, there can be heavy traffic, medium traffic, light traffic, or no traffic. It is understood that traffic information such as density of cars or velocity of cars will correspond to different traffic conditions depending on the type of roadway. For example, a high density of cars in an urban environment such as a downtown area may correspond to light or medium traffic, while a high density of cars on a highway will correspond to heavy traffic.

Other features and associated advantages will become apparent with reference to the following detailed description of specific embodiments in connection with the accompanying drawings.

BRIEF DESCRIPTION OF THE DRAWINGS

The following drawings form part of the present specification and are included to further demonstrate certain aspects of systems and methods described herein, which may be better understood by reference to one or more of these drawings in combination with the detailed description of specific embodiments presented herein.

DETAILED DESCRIPTION

Figure 1:
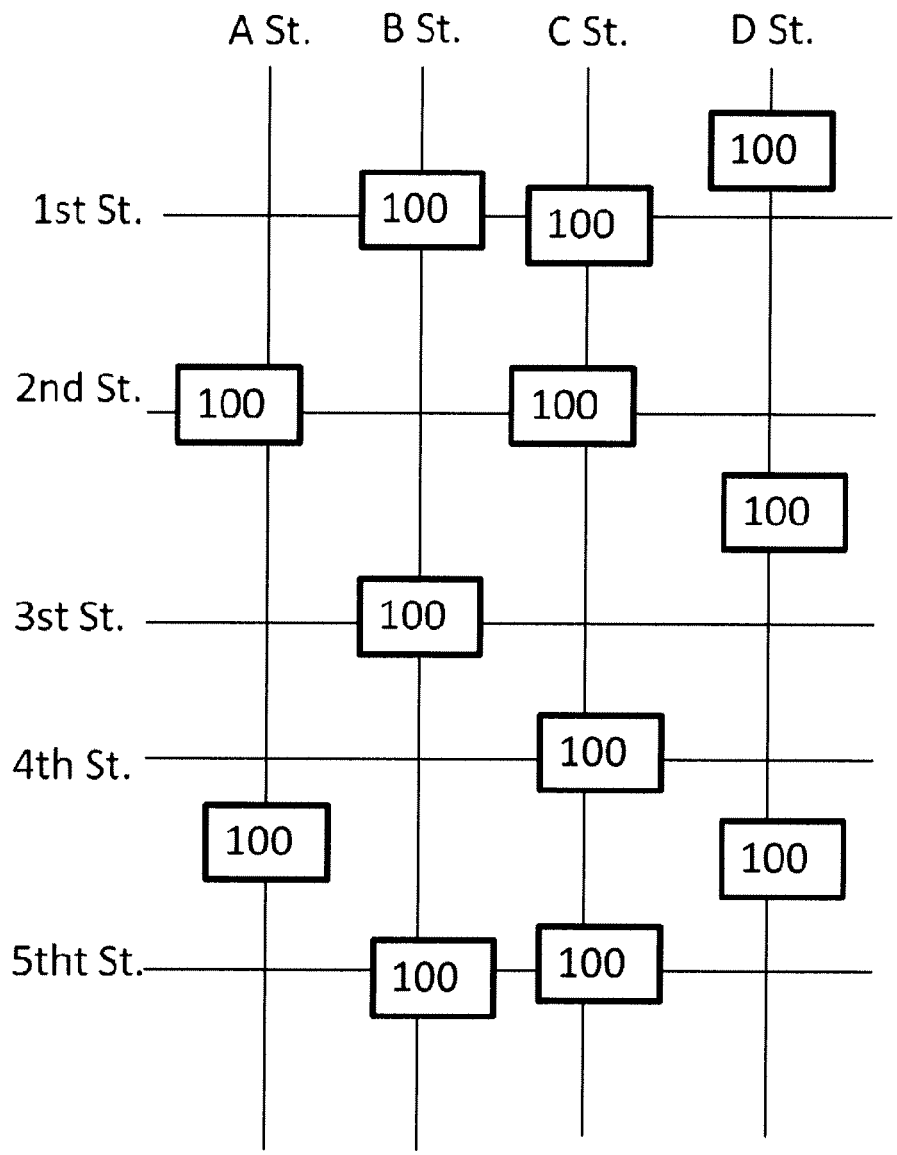
FIG. 1 illustrates one embodiment of grid representing streets with ultrasound sensors distributed along the streets.

Various features and advantageous details are explained more fully with reference to the nonlimiting embodiments that are illustrated in the accompanying drawings and detailed in the following description. Descriptions of well known starting materials, processing techniques, components, and equipment are omitted so as not to unnecessarily obscure the invention in detail. It should be understood, however, that the detailed description and the specific examples, while indicating embodiments of the invention, are given by way of illustration only, and not by way of limitation. Various substitutions, modifications, additions, and/or rearrangements within the spirit and/or scope of the underlying inventive concept will become apparent to those skilled in the art from this disclosure.

Certain units described in this specification have been labeled as modules, in order to more particularly emphasize their implementation independence. A module is "[a] self-contained hardware or software component that interacts with a larger system. Alan Freedman, "The Computer Glossary" 268 (8th ed. 1998). A module comprises a machine or machines executable instructions. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also include software-defined units or instructions, that when executed by a processing machine or device, transform data stored on a data storage device from a first state to a second state. An identified module of executable code may, for instance, comprise one or more physical or logical blocks of computer instructions which may be organized as an object, procedure, or function. Nevertheless, the executables of an identified module need not be physically located together, but may comprise disparate instructions stored in different locations which, when joined logically together, comprise the module, and when executed by the processor, achieve the stated data transformation.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

In the following description, numerous specific details are provided, such as examples of programming, software modules, user selections, network transactions, database queries, database structures, hardware modules, hardware circuits, hardware chips, etc., to provide a thorough understanding of the present embodiments. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 illustrates one embodiment of a system for monitoring flooding and traffic. In this embodiment, a roadmap is shown displaying A-D streets which run north to south and $1^{st}$-$5^{th}$ streets which run east to west. The system includes distributed sensors 100 which are mounted over streets or intersections. The sensors 100 measure traffic data such as the number of cars passing by per minute (or per hour) and/or the speed of the cars passing under the sensor 100. The sensors 100 also measure if there is water present on the roadway. If there is water present, the sensor 100 may also measure the water level. The sensors 100 are able to measure either or both water level and traffic.

Figure 2:
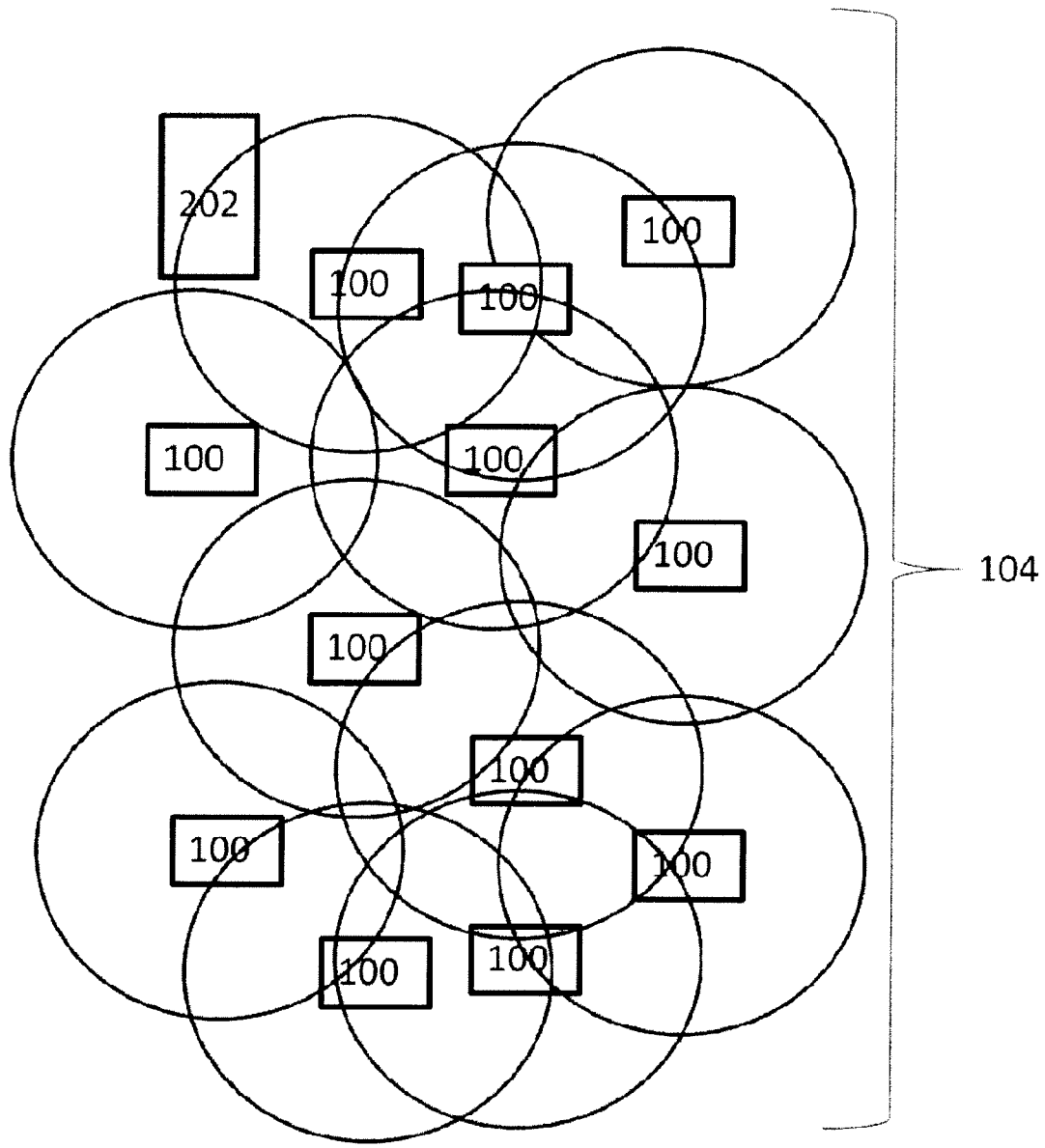
FIG. 2 illustrates an ad hoc network being formed by the wirelessly communicating ultrasound sensor apparatus.

FIG. 2 illustrates an embodiment of the wireless (mesh) sensor network in which data is exchanged between sensors 100 as part of the data acquisition process. Each sensor 100 can communicate with nearby sensors 100 forming an ad hoc network 104. The sensors 100 then communicate collected data to a central data collection site 202, such as a backend server system. The central data collection site 202 may then process the local traffic and flood conditions relayed by the sensors 100. The global traffic conditions may be estimated using traffic flow models and origin-destination models to create a map of current and future traffic flow conditions. The global flood conditions are forecasted using current conditions, meteorological data and sewer models. Any algorithm may be used that simulates floods. These include hydrodynamical models based on finite element methods, which can include variations (mesh refinement, model reduction, etc). To forecast floods, standard estimation methods may be used for distributed parameter systems such as: ensemble Kalman filtering, particle filtering. The standard estimation methods may be combined with additional flood simulation algorithms.

Figure 3:
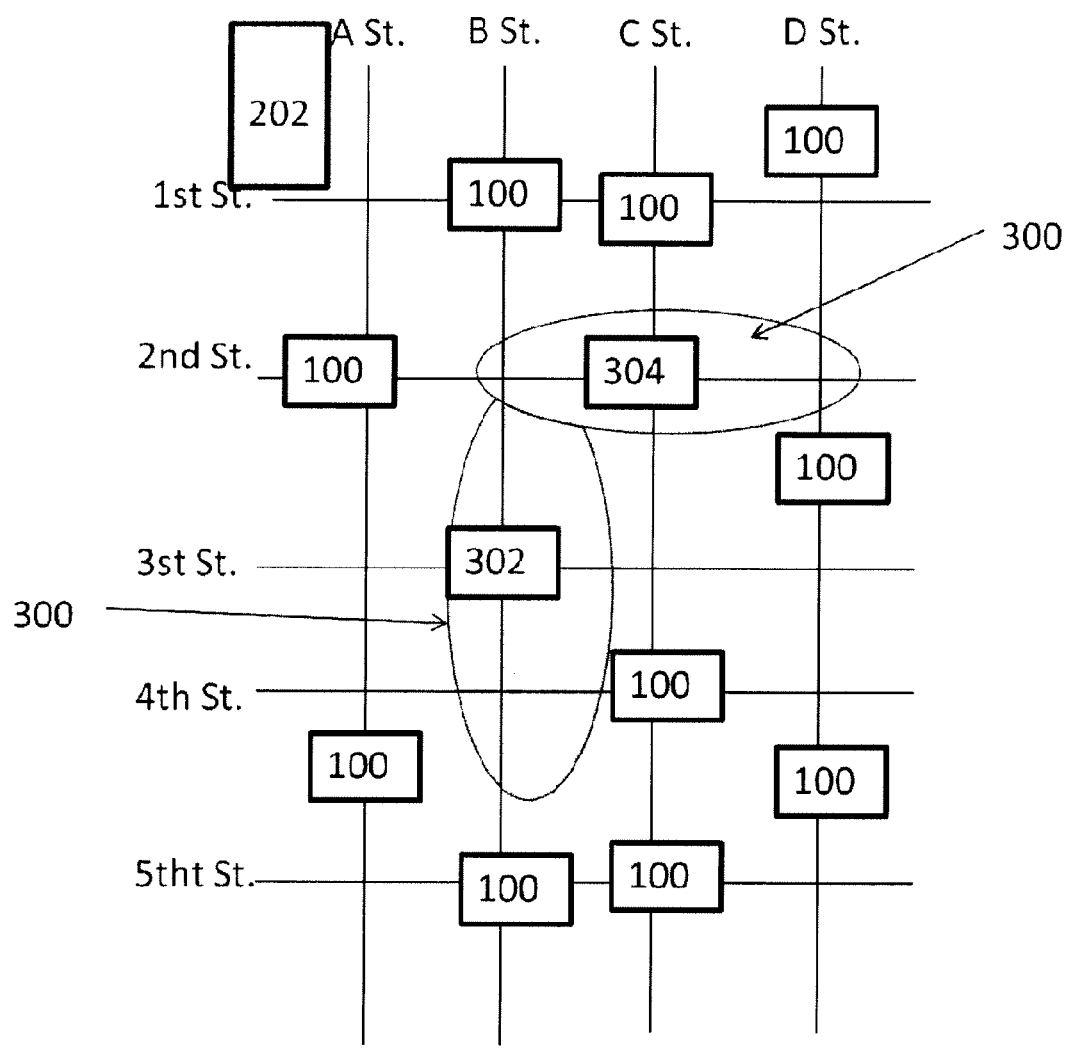
FIG. 3 illustrates a grid of streets experiencing flooding as well as distributed ultrasound sensors and/or remote infrared temperature sensors.
Figure 4:
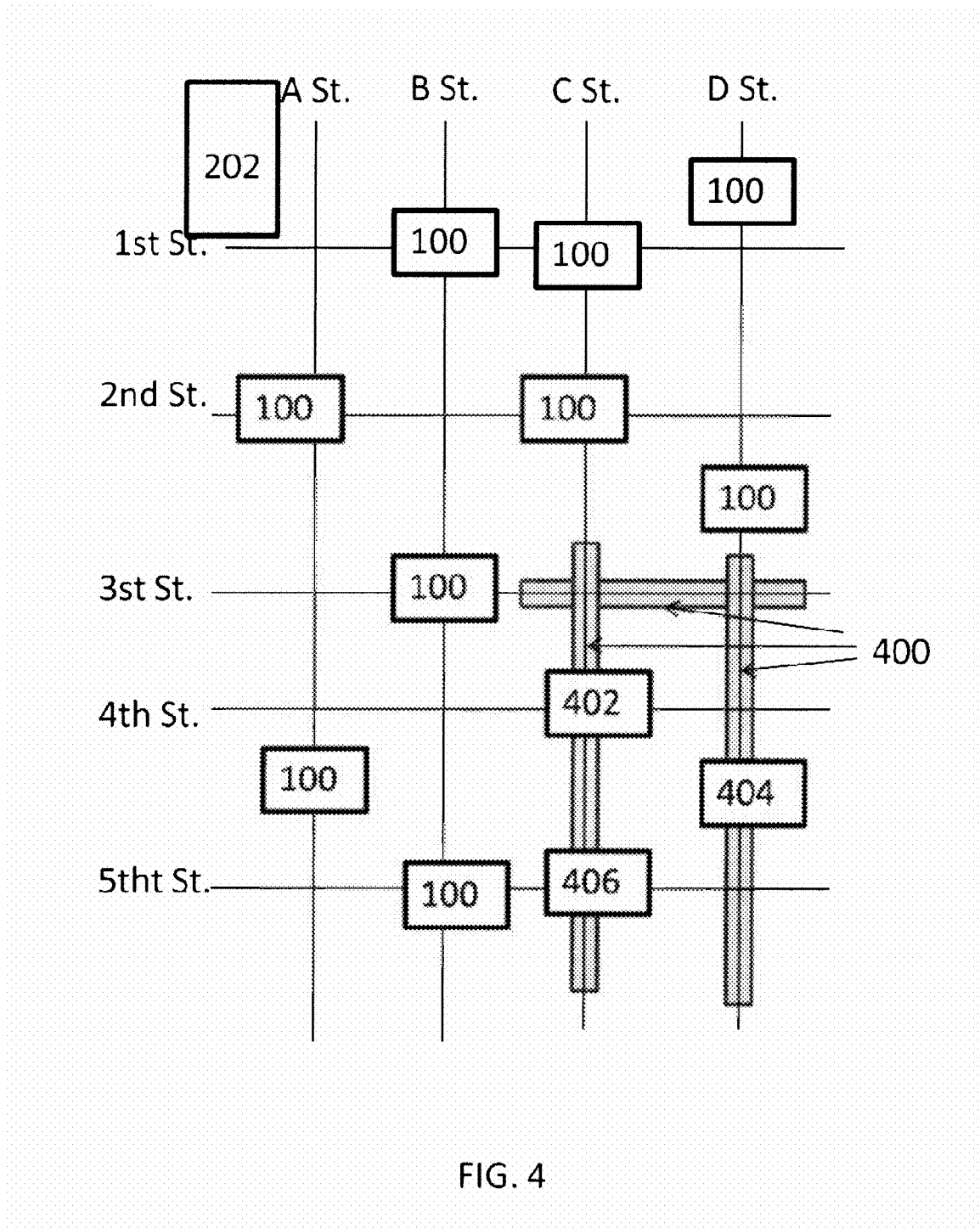
FIG. 4 illustrates a grid of streets experiencing areas of heavy traffic and distributed ultrasound sensors.

FIG. 3 illustrates a street grid with flooding 300 displayed as shaded ovals. Sensors 302 and 304 detect the presence of water and/or the level of flooding and transmit the data to the central data collection site 202 through the ad hoc network. FIG. 4 illustrates a street grid with areas of heavy traffic 400 displayed as shaded rectangles. The heavy traffic 400 is detected by the sensors 402, 404 and 406, and transmitted back to the central data collection site 202. The sensors 100 may collect traffic data by detecting the speed of the cars passing under the sensors 100, or detecting the rate of the cars passing under the sensors 100, such as by counting the number of cars per minute. Local traffic conditions may correspond to the local density, flow and velocity conditions across a roadway.

Figure 5:
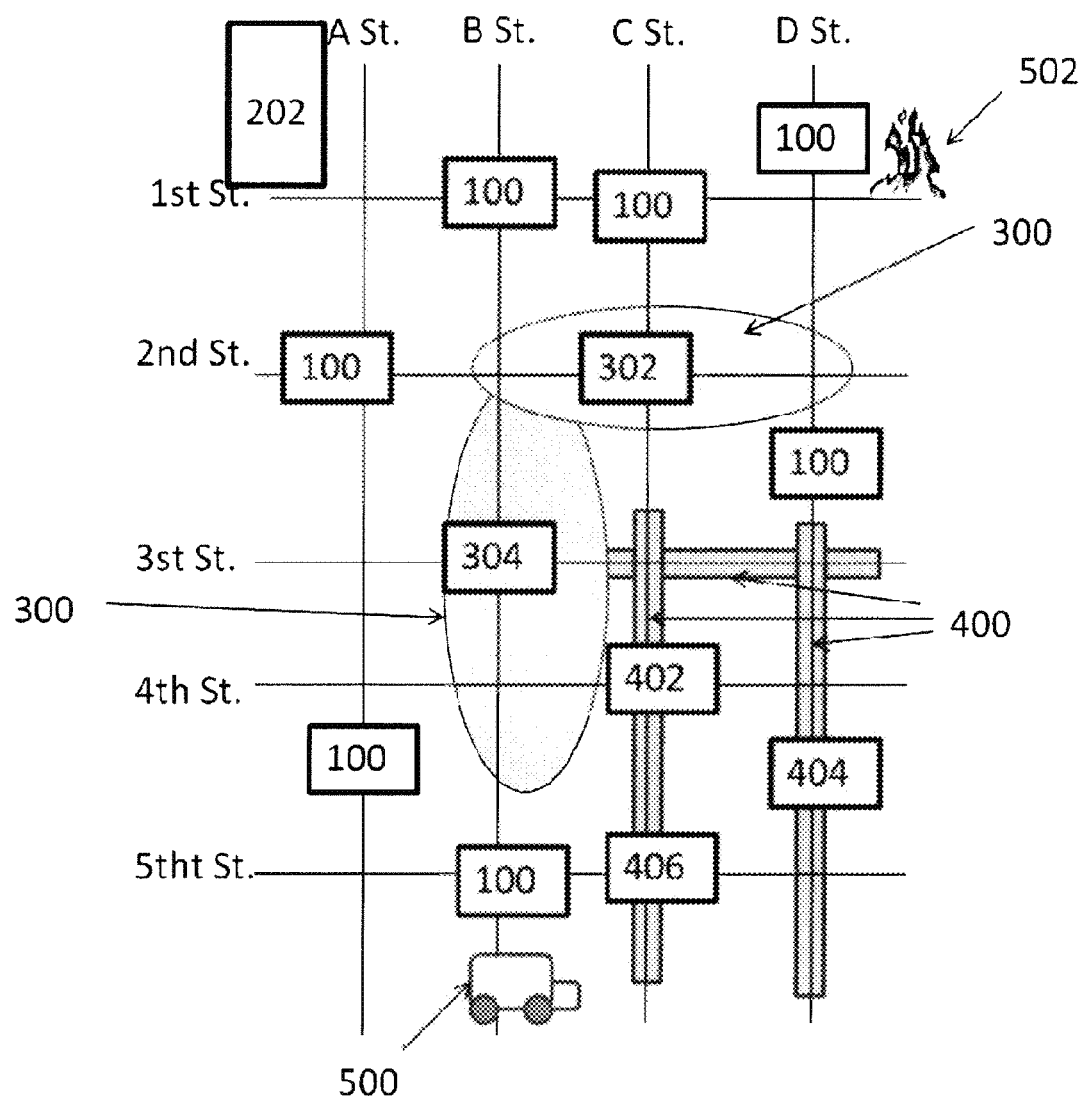
FIG. 5 illustrates a grid of streets experiencing both flooding, heavy traffic, and a fire, and also illustrates the distributed ultrasound sensors.

FIG. 5 displays a street grid with areas of both flooding 300 and heavy traffic 400. An ambulance 500 is dispatched to respond to a fire 502 located seven blocks away. In this embodiment, sensors 302 and 304 detect flooding levels and transfer the data back to the central data collection site 202. Sensors 402, 404 and 406 detect the areas of heavy traffic and send the data back to the data collection site. All other sensors 100 collect data showing no flooding and light levels of traffic and send the data back to data collection site 202. The received data is analyzed at the data collection site 202 to determine if the areas of flooding are passable by emergency vehicles and where the areas of heavy or medium traffic are. The data may also be analyzed at the sensor level. The data collection site 202 may then respond to a query for routing information, for example by an emergency vehicle 500, or an emergency dispatch operator. The data collection site 202 or a server with access to the data at the data collection site 202 may then calculate a route for the emergency vehicle 500 to the emergency 502. The calculated route would avoid streets with impassable flooding 300 and heavy traffic 400. Such a route would take the emergency vehicle 500 north to $5^{th}$ St., west to A St., north to $1^{st}$ St. and then east on $1^{st}$ St. to the emergency 502, for example.

Figure 6:
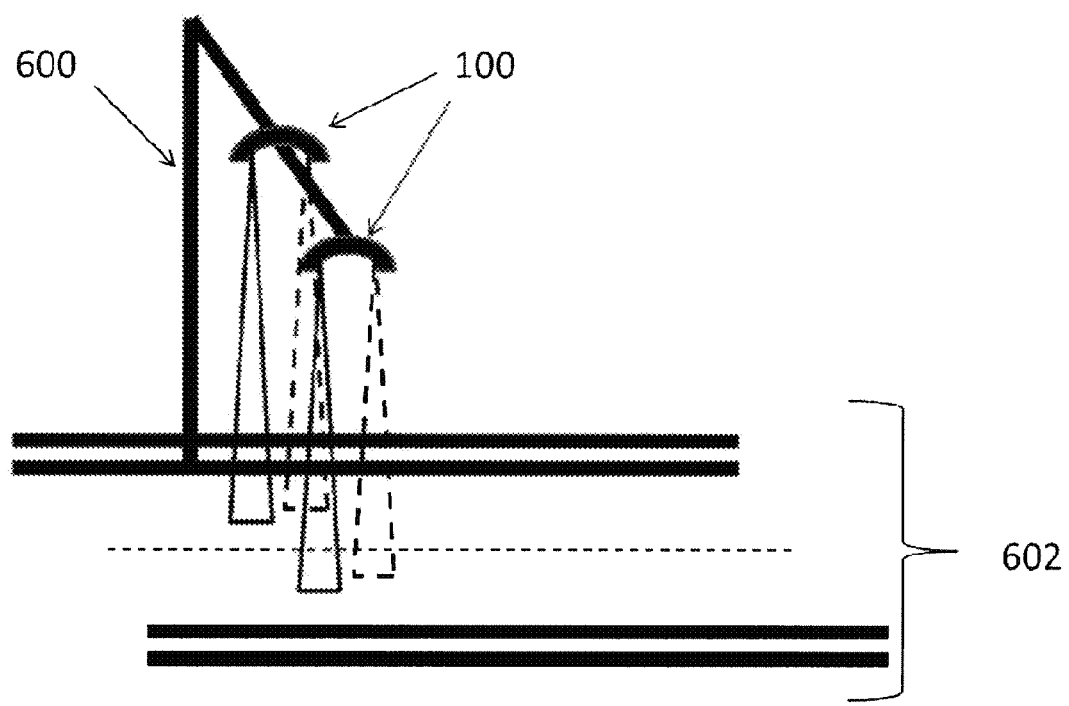
FIG. 6 illustrates one embodiment of the ultrasound sensors mounted above a street.
Figure 7:
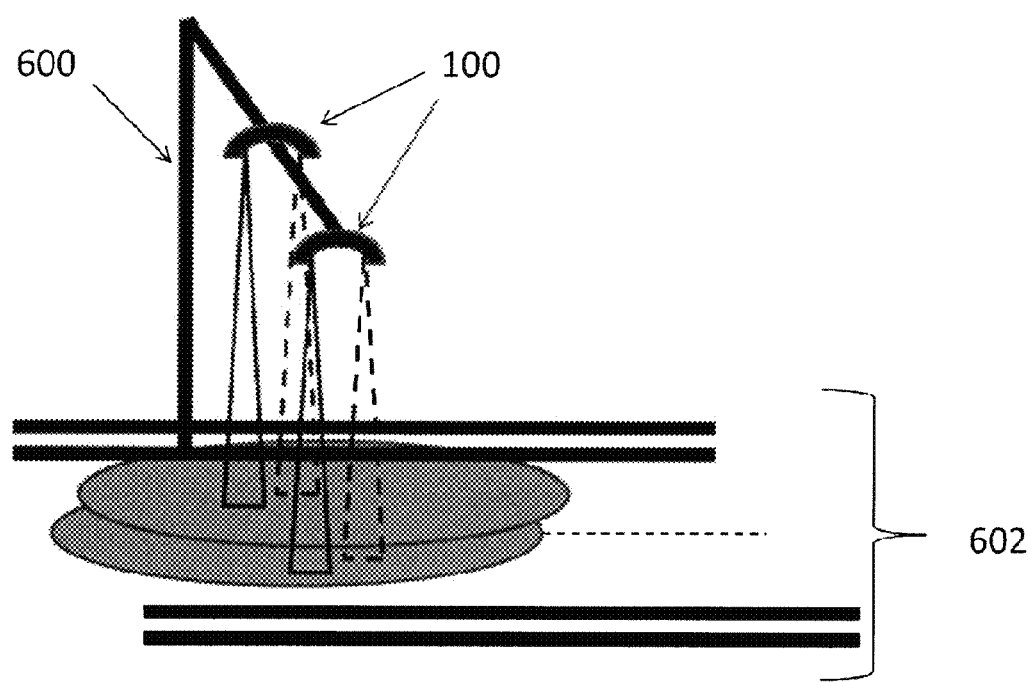
FIG. 7 illustrates one embodiment of the ultrasound sensors mounted above a flooded street.

FIG. 6 is an illustration of an example of two deployed sensors. Each sensor 100 is deployed above the road and may be deployed above each lane in the road 602. The sensors 100 are mounted on poles 600, for example, above the roadway. The sensors 100 may also be mounted on other structures, such as overhead crossings, mast-arms or sign gantry mounts or on buildings located to the sides of the roadway. The sensors 100 may need to be calibrated. FIG. 7 is an illustration of an example of two deployed sensors 100, where the sensors 100 are deployed over a flooded road 602. The sensors 100, which can be ultrasound sensors and/or remote infrared temperature sensors, can detect the level of the water on the flooded road 602.

Figure 8:
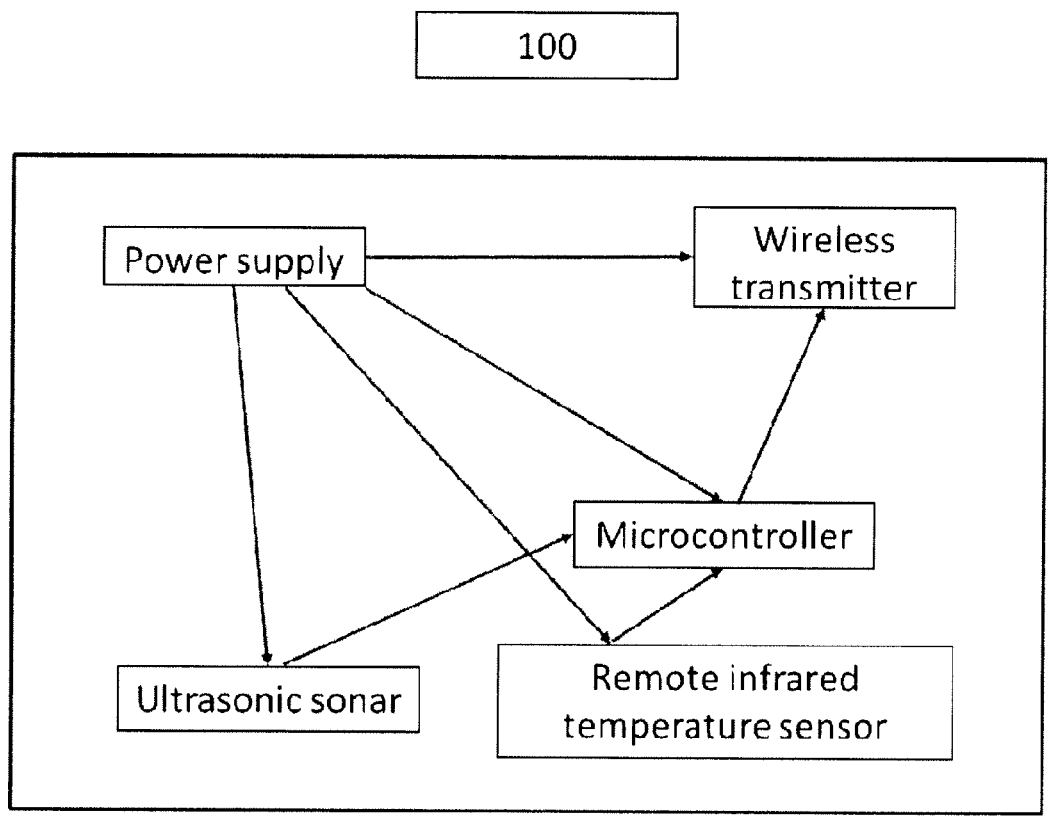
FIG. 8 is a schematic of the ultrasound sensor.

FIG. 8 is a schematic of an individual sensor, as an example. The sensor comprises a power supply, a wireless transmitter, a microcontroller, an ultrasound sonar and a remote infrared temperature sensor. The ultrasound sensor can measure traffic by measuring the velocity and/or the density of cars passing under the sensor. The ultrasound sensor can also measure the presence, absence or level of water on the roadway under the sensor. Further, the sensor can also measure precipitation levels, such as light, medium or heavy rain. In an embodiment, the water level can be calculated by estimating the local speed of sound, c, and the distance, x, between the sensor and the water surface (or ground surface when the pavement is dry) which is given by $x=cT$, where T is half the duration between emission and reception of an echo. The speed of sound in the air layer between the ultrasound sensor and the ground can be estimated using local and remote temperature measurements obtained from the remote infrared temperature sensor or from a thermal model of the air layer. The thermal model of the air layer (which is a function of the local wind conditions) can be estimated by exchanging temperature measurements between individual sensors and comparing these current temperatures with previously obtained temperatures. Algorithms such as consensus algorithms can be used for these processes. The speed of sound can be estimated using the local temperature, which can be either be inferred from local meteorological condition or from temperature sensors contained in the sensor device. An ultrasound sensor may measure precipitation by generating ultrasound waves which bounce off of water droplets creating echoes that may be measured by the detector or transceiver in the sensor. By processing these echoes, the rain levels are able to be reconstructed. In one example, least squares are used 'track' the fall of water droplets, by reading the analog envelope output of the ultrasonic sensor. By tracking the fall of water droplets, one can estimate their terminal velocity, and thus, their velocity (which are related). If n is the number of droplets detected per time unit, v is the droplet volume (function of v only), and S is the cross section of the ultrasonic beam, and the rain rate r is r=nV/S, for example.

All of the methods disclosed and claimed herein can be made and executed without undue experimentation in light of the present disclosure. While the apparatus and methods of this invention have been described in terms of preferred embodiments, it will be apparent to those of skill in the art that variations may be applied to the methods and in the steps or in the sequence of steps of the method described herein without departing from the concept, spirit and scope of the invention. In addition, modifications may be made to the disclosed apparatus and components may be eliminated or substituted for the components described herein where the same or similar results would be achieved. All such similar substitutes and modifications apparent to those skilled in the art are deemed to be within the spirit, scope, and concept of the invention as defined by the appended claims.

What is claimed is:

1. A computer program product comprising a non-transitory computer readable medium having computer usable program code executable to perform operations to monitor traffic and roadway water conditions, the operations of the computer program product comprising:
   detecting traffic data and water level from at least one sensor disposed above a roadway;
   receiving a plurality of roadway condition information comprising a roadway location, traffic condition information and water condition information;
   estimating the average speed of sound in an air layer between the at least one sensor and the roadway location;
   measuring the water level on the roadway location based on the estimated average speed of sound;
   determining if the roadway location is impassable based on the detected traffic data and water level; and
   mapping the plurality of roadway information by location.

2. The computer program product of claim 1, further comprising receiving routing information comprising a start location and an end location and determining a route from the start location to the end location that avoids impassable roadway locations.

3. The computer program product of claim 1, wherein the determined traffic condition is heavy traffic, medium traffic, light traffic, or no traffic.

4. The computer program product of claim 1, wherein each of the at least one sensor senses the traffic data and the water level, and wherein the traffic condition information corresponds to the traffic data and the water condition information corresponds to the water level.

5. The computer program product of claim 2, further comprising mapping the route.

6. The computer program product of claim 2, wherein the determined route also avoids roadway locations with heavy traffic.

7. The computer program product of claim 4, wherein the at least one sensor is an infrared sensor.

8. The computer program product of claim 4, wherein the at least one sensor is an ultrasound sensor.

9. The computer program product of claim 4, wherein the computer program product is further configured to measure a level of water on the roadway location under the at least one sensor.

10. The computer program product of claim 4, wherein the computer program product is further configured to measure precipitation levels on the roadway location under the sensor.

11. The computer program product of claim 4, wherein the computer program product is further configured to estimate the speed of sound in an air layer between the at least one sensor and the roadway location under the at least one sensor.

12. A method comprising:
    detecting traffic data and a water level with a sensor positioned above a roadway;
    receiving roadway condition information comprising a roadway location;
    estimating the average speed of sound in an air layer between the sensor and the roadway location;
    measuring the water level on the roadway location based on the estimated average speed of sound;
    determining if the roadway location is impassable based on the detected traffic data and water level; and
    mapping the roadway condition information by location.

13. The method of claim 12, wherein the roadway condition information further comprises traffic condition information.

14. The method of claim 12, wherein the roadway condition information further comprises water condition information.

15. The method of claim 12, wherein the sensor mounted over the roadway location senses the traffic data and the water level.

16. The method of claim 12, further comprising receiving routing information comprising a start location and an end location and determining a route from the start location to the end location that avoids impassable roadway locations.

17. The method of claim 12, wherein the determined traffic condition is heavy traffic, medium traffic, light traffic, or no traffic.

18. The method of claim 12, wherein the determined traffic condition is estimated vehicle flow and/or estimated vehicle speed.

19. The method of claim 12, wherein the roadway condition information is detected by at least one sensor disposed above the roadway, and wherein each of the at least one sensor senses the traffic condition information and the water condition information.

20. The method of claim 14, or 15, wherein the water condition information is a level of water on the roadway location.

21. The method of claim 16, further comprising mapping the route.

22. The method of claim 16, wherein the determined route also avoids roadway locations with heavy traffic.

23. The method of claim 16, wherein the determined route is the fastest route.

24. The method of claim 19, wherein the at least one sensor is an infrared sensor.

25. The method of claim 19, wherein the at least one sensor is an ultrasound sensor.

26. The method of claim 19, wherein the at least one sensor measures the level of water on the roadway location under the at least one sensor.

27. The method of claim 19, wherein the at least one sensor measures precipitation levels on the roadway location under the at least one sensor.

28. The method of claim 19, further comprising estimating the speed of sound in an air layer between the at least one sensor and the roadway location under the at least one sensor.

29. The method of claim 20, further comprising estimating the speed of sound in an air layer between the at least one sensor and the roadway location under the at least one sensor.

30. The method of claim 20, wherein the at least one sensor is disposed above the roadway location, and wherein the method further comprises calculating the level of water by estimating the local speed of sound and a distance from the at least one sensor.

* * * * *